US007350638B2

(12) United States Patent
Ramnarain et al.

(10) Patent No.: US 7,350,638 B2

(45) Date of Patent: Apr. 1, 2008

(54) ALIGNMENT APPARATUS FOR PACKAGING ELEMENTS

(76) Inventors: David R. Ramnarain, 595 - 128th St. West, Shakopee, MN (US) 55379; Brian D. Ramnarain, 595 - 128th St. West, Shakopee, MN (US) 55379; Christopher D. Ramnarain, 595 - 128th St. West, Shakopee, MN (US) 55379

( * ) Notice: Subject to any disclaimer, the term of this patent is extended or adjusted under 35 U.S.C. 154(b) by 435 days.

(21) Appl. No.: 11/222,407

(22) Filed: Sep. 8, 2005

(65) Prior Publication Data

US 2007/0051070 A1 Mar. 8, 2007

(51) Int. Cl.
*B65G 47/24* (2006.01)

(52) U.S. Cl. ...................... 198/380; 198/398; 198/495; 414/755

(58) Field of Classification Search ................ 198/380, 198/383, 398, 438, 493, 495; 414/755; 209/543, 209/932; 53/68, 490
See application file for complete search history.

(56) References Cited

U.S. PATENT DOCUMENTS

| | | | | |
|---|---|---|---|---|
| 3,734,268 | A * | 5/1973 | Burger et al. | 198/380 |
| 3,874,740 | A * | 4/1975 | Hurd | 198/380 |
| 4,885,894 | A * | 12/1989 | Herzog | 53/68 |
| 5,070,988 | A * | 12/1991 | Konishi et al. | 198/380 |
| 5,503,515 | A * | 4/1996 | Moorehead | 414/755 |

* cited by examiner

*Primary Examiner*—James R Bidwell
(74) *Attorney, Agent, or Firm*—Thomas J. Nikolai; Nikolai & Mersereau, P.A.

(57) ABSTRACT

An alignment apparatus for use in packaging. The device generally uses a guide plate, dome shaped member through which a stream of air flows, and guide bar to reject improperly packaging elements. This apparatus provides an easy way to ensure properly oriented and aligned packaging elements during the automated packaging processes, thereby reducing wasteful and costly errors due to incorrectly aligned packaging elements.

16 Claims, 6 Drawing Sheets

ALIGNMENT APPARATUS FOR PACKAGING ELEMENTS

BACKGROUND OF THE INVENTION

I. Field of the Invention

This invention relates generally to packaging equipment and more particularly to a device used to reject improperly oriented packaging elements such as bottle caps during the packaging process.

II. Discussion of the Prior Art

Plastic bottles are an increasingly important form of packaging in the world today. The durability and convenience they provide is recognized by persons in virtually all segments of society. Many of these plastic bottles are sealed with plastic, screw on caps to preserve the contents stored within the bottle's confines. Products making use of plastic bottle caps are numerous and are not limited to any specific type of goods. Commonly these caps seal bottles used to package various types of beverages including soft drinks and water, and a wide range of other liquids and substances.

Due to the high demand for these products, plastic bottling plants manufacture billions of capped plastic bottles every year. To meet such demand, bottling plants must use efficient, highly automated processes and machines which enable a uniform flow of materials during production. One area which has proven to be problematic to these machines is the tendency of plastic bottle caps to flip or become incorrectly orientated during the manufacturing process. It is desired that when these bottle caps are fed into the mechanism performing bottle sealing, the caps are aligned such that they lay on their closed circular portion with the open end located above it.

Because of the relative ease by which these caps become misaligned during the manufacturing process, failure to correct the misalignment frequently results in bottle caps being fed upside-down into the capping machine and incorrect capping taking place. The resulting flawed products cause disruptions in the bottling process and a considerable amount of wasted time and materials. Devices attempting to solve this problem have generally been complicated apparatuses which reject incorrectly orientated caps and allow properly aligned caps to fit within a series of grooved components. These apparatuses have many parts, use a complex mechanism, and are not always successful in accomplishing a relatively simple job. Therefore what is needed is a simplified and more efficient manner in which to align and orient bottle caps in the manufacturing process.

The problems outlined above are not limited to bottles and bottle caps. Many other forms of packaging are sealed using other types of sealing members, many of which have cupped or recessed portions like the sealing members used to cap bottles.

SUMMARY OF THE INVENTION

The present invention provides an apparatus that can be used in the production of packaged items. More specifically, the apparatus of the present invention is intended to correctly orient sealing members for packaging before they are fed into a machine for attachment to a package. The apparatus itself is generally made up of a guide plate, a guide bar, and a dome-shaped member projecting from the top of the guide plate having a port through which a stream of air flows.

To meet the disclosure requirements of the patent laws, the present invention will be described in connection with the way it is used to ensure proper orientation of bottle caps as they are delivered to a capping machine. This disclosure is not intended to be limiting. The present invention can be used to ensure proper orientation of other sealing members or packaging elements and particularly packaging elements (including sealing members) that have a cupped or recessed area.

When the present invention is used to ensure proper orientation of bottle caps, the bottle caps are fed across a sloped guide plate along the guide bar. As they are fed, each cap is partially pushed over the dome-shaped member. That member contains an orifice on its face, out of which an air port directs a stream of air in a direction away from the guide bar. If the cap is oriented open side up, the cap will position itself such that it will largely be unexposed to the air stream and will simply pass over one side of the dome-shaped housing and continue on to the next bottling machine. If the cap is oriented open side down, then the cap's inside surface will be subjected to the air stream shooting out the air port. This stream of air will divert the cap into a reject bin, thereby removing improperly aligned caps so they are not fed into the capping machine. The result is a reliable stream of correctly oriented plastic caps provided within the bottling process using a simple apparatus with few or no moving parts. Accordingly, those skilled in the art will appreciate from the foregoing that the present invention provides an easy mechanism for aligning bottle caps.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements related to packaging mechanisms. As set forth above in the summary of the invention, the embodiments and uses herein described are intended to be taken as representative of those in which the invention may be incorporated and are not intended to be limiting.

Figure 1:
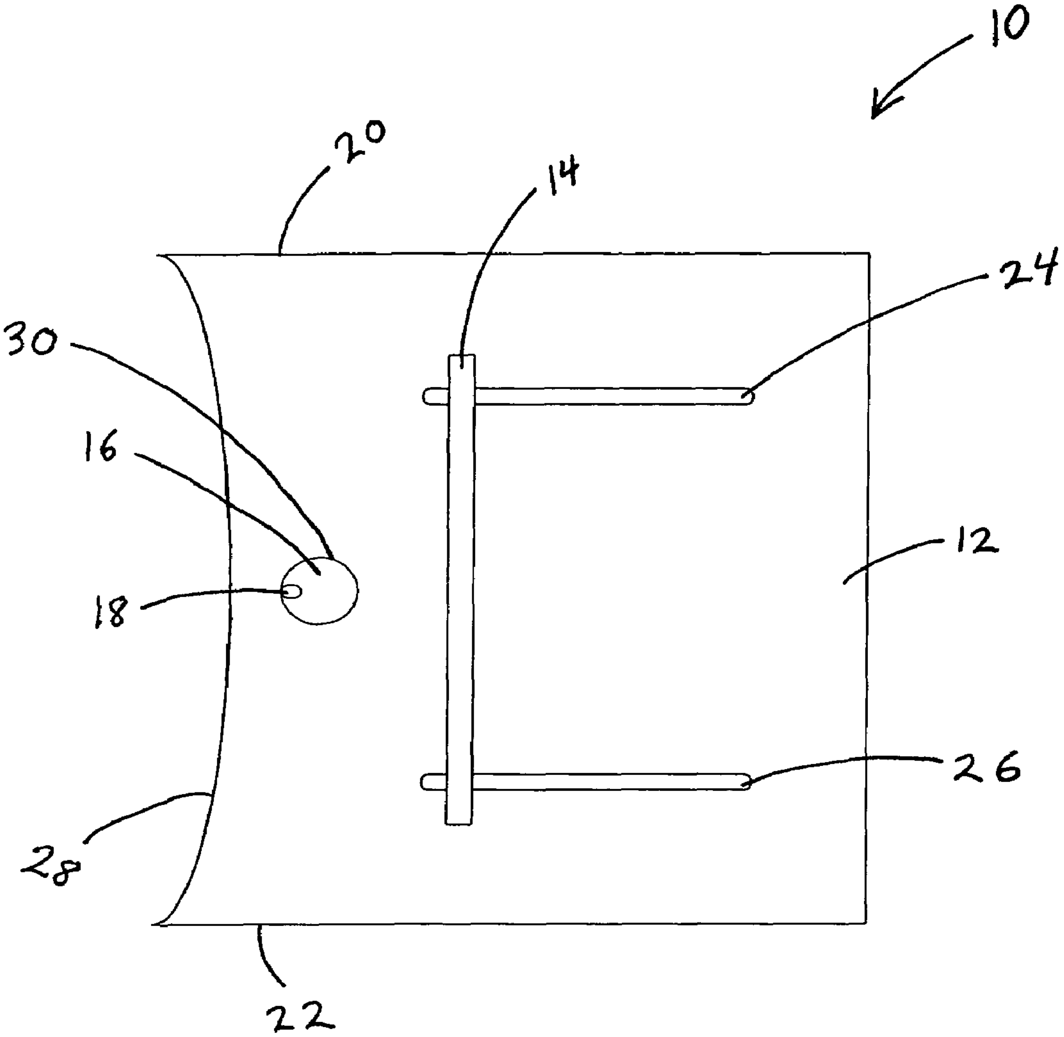
FIG. 1 is a top view of the alignment apparatus of the present invention.

FIG. 1 shows a top view of the alignment apparatus 10. It is generally is made up of a guide plate 12, a guide bar 14, a dome shaped member 16 projecting from the top of the housing, and a port 18. The dome shaped member 16 is coupled to a supply of pressurized air such that an air stream exits the port 18. The top surface of guide plate 12 is a flat planar member across which bottle caps can be easily slid from edge 20 to edge 22. Guide plate 12 is shown to be a primarily rectangular shape, however it does have two parallel rectangular slots 24 and 26 in which the fasteners 36 to guide bar 14 reside. Also, there is a curved edge 28 of the guide plate which is shaped in a concave fashion. This curved edge 28 protrudes inward toward the port 18, allowing for more efficient rejection of misaligned caps. Guide plate 12 also contains a circular opening 30 through which dome shaped member 16 protrudes. This hole is somewhat centrally located between edges 20 and 22 and is close in proximity to curved edge 28.

Dome shaped member 16 is hollow with a generally hemispherical outer surface. Those skilled in the art will recognize this dome shaped member may also be arced or any other shaped protrusion appropriate for a similar mechanisms and apparatus. Passing through the outer surface and in communication with the hollow interior is a single opening referred to as port 18. When the dome shaped member 16 is coupled to a source of air, port 18 provides a generally horizontal air stream. The port 18 is positioned so that it directs this air stream at the center of curved edge 18 of the guide plate 12.

Guide bar 14 is seen in FIG. 1 to extend across the horizontal slots 24 and 26 of guide plate 12 in a perpendicular fashion. Guide bar 14 may be moved to various other positions along the slots 24 and 26 as the guide bar 14 is releasably attached within these slots. When setting up the alignment apparatus the guide bar 14 is moved until it is located in the proper configuration for the packaging element of a given dimension. In this way, the packaging elements of many shapes and sizes can make use of the alignment apparatus by simply altering the location of the guide plate 12.

Figure 2:
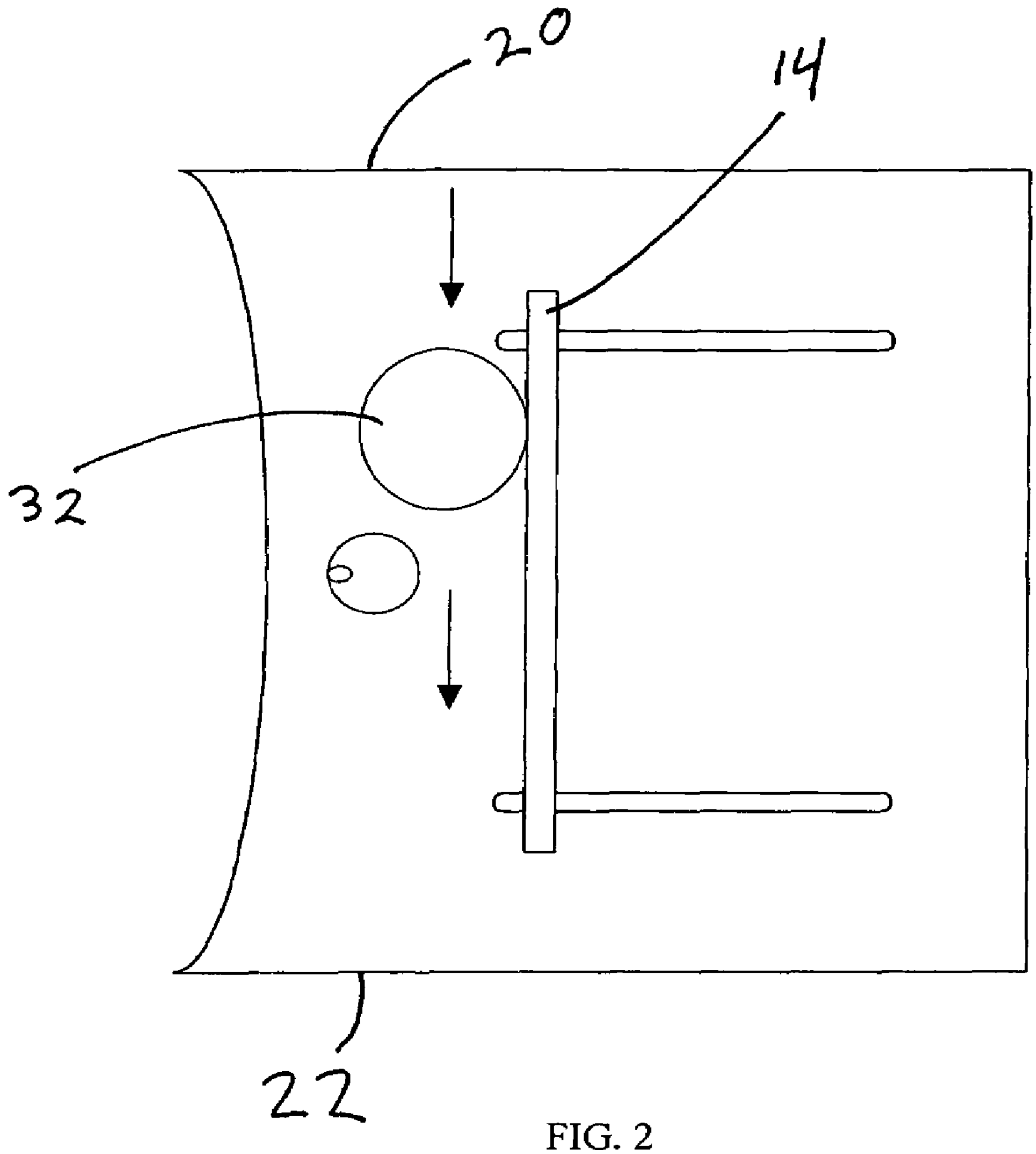
FIG. 2 is a top view of the alignment apparatus of the present invention and includes a diagram of a open-side-up bottle cap's path across the apparatus.

Shown in FIG. 2 is a top view of the present invention including arrows generally indicating the path of a properly oriented packaging element such as a bottle cap 32. As shown in FIG. 2, bottle cap 32 generally traverses across the guide plate 12 by moving along guide bar 14 and over the dome shaped member 16 as the cap travels from edge 20 toward edge 22. See also FIG. 5.

Figure 3:
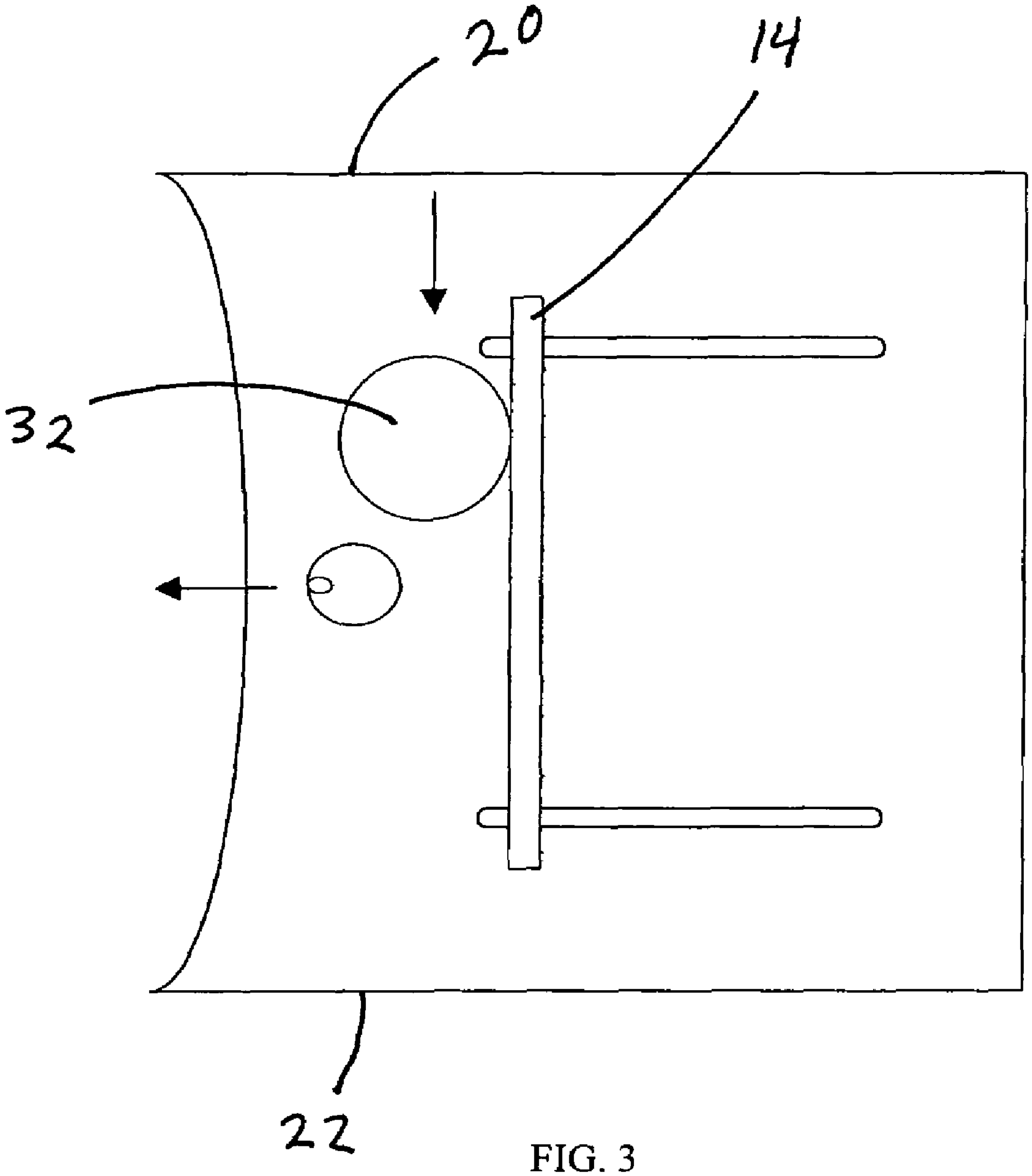
FIG. 3 is a top view of the alignment apparatus of the present invention and includes a diagram of a open-side-down bottle cap's path across the apparatus.

Shown in FIG. 3 is a top view similar to FIG. 2. In FIG. 3, the arrows show the path of a cap that is not properly oriented. A cap that has the closed side up will drop once the dome shaped member enters the path of the air stream exiting port 18. See FIG. 6. The air stream will then engage the cap, moving it to a reject bin.

Figure 4:
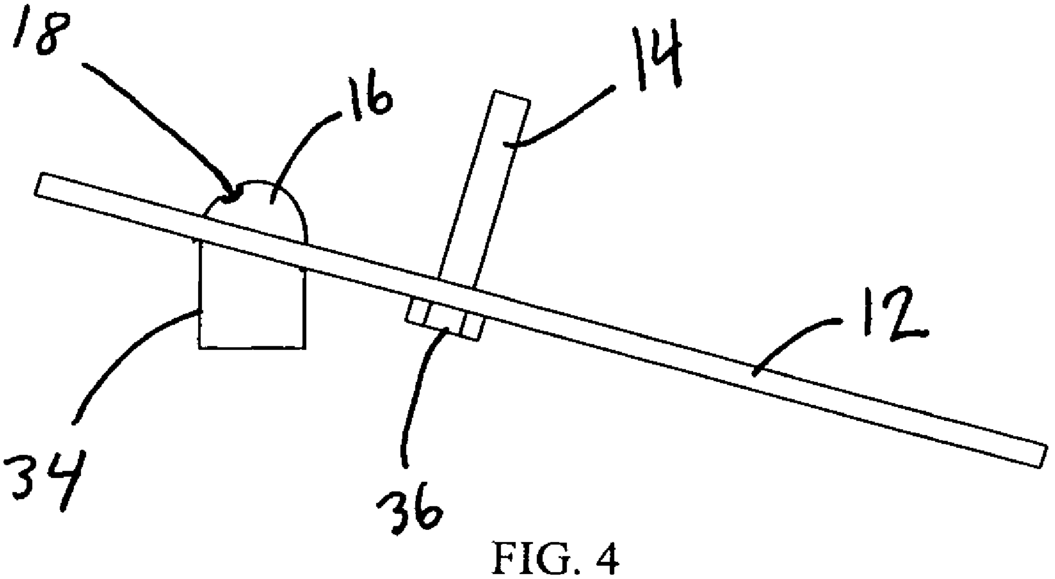
FIG. 4 is a side view of the alignment apparatus.

Disclosed in FIG. 4 is a side view of the alignment apparatus. Not only can the guide plate 12, guide bar 14, dome shaped member 16, and port 18 be seen, but a side view of the container 34 and fasteners 36 are disclosed as well. Here, the guide plate 12 is configured in a sloping disposition to aid in the movement of packaging elements and to help prevent correctly aligned packaging elements from being exposed to the air jet from port 18. There are at least two fasteners 36, one underneath each rectangular slot 24 and 26, in the form of bolts or other locking mechanisms which serve to hold the guide bar 14 in place. These fasteners are readily interchangeable, so as to accommodate various sizes of caps in need of proper alignment. Container 34 is a unit providing air pressure that may be expelled under considerable pressure through port 18. Container 34 can house an air compressor or other device and can take on the shape most appropriate for that means of producing an acceptable air supply.

Figure 5:
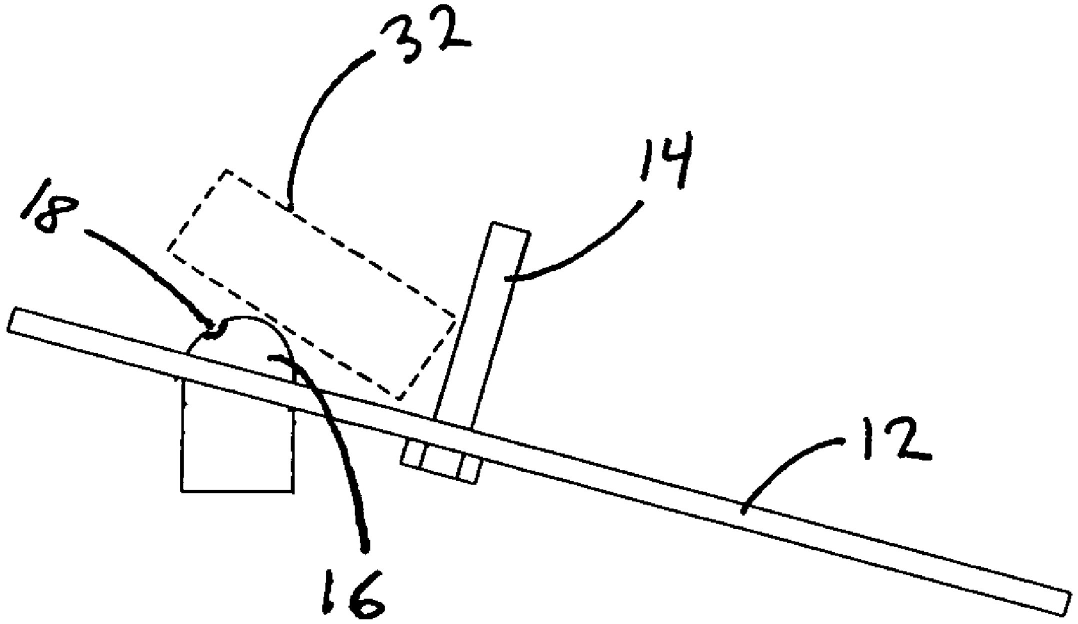
FIG. 5 is a side view of the alignment apparatus which further shows the position of an open-side-up cap passing over the housing.

FIG. 5 sets forth a side view of the alignment apparatus setup to ensure proper alignment of a particular style bottle cap. FIG. 5 shows the approximate cap location for an open-side-up cap as it passes over dome shaped member 16. Because of the configuration of the alignment assembly, the bottle cap's round flat surface only contacts the member 16 on a small portion of the side of the dome's surface. The bottle cap 32 is generally pushed against the guide plate 12 and guide bar 14 without any interference from the jet of air exiting the air port 18.

Figure 6:
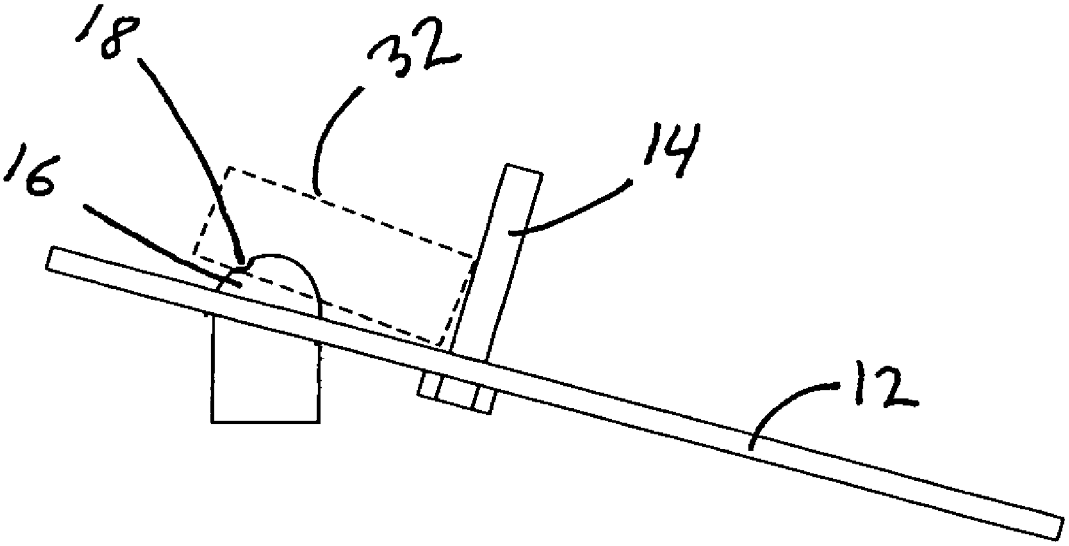
FIG. 6 is a side view of the alignment apparatus which further shows the position of an open-side-down cap passing over the housing.

FIG. 6 sets forth a side view of the alignment apparatus with the approximate cap location for an open-side-down cap as it passes over dome shaped member 16. Because of the configuration of the alignment assembly, the bottle cap drops over member 16 and is exposed to the air flow from air port 18. The cap will not remain in the described position for more than an instant, and will quickly be shot in the direction of the curved edge 28 of the plate.

The operation of the alignment apparatus is as follows. First, manufactured bottle caps 32, alternatively, (or some other packaging element) are pushed across the surface of the sloped guide plate 12 from edge 20 toward edge 22 such that the side of the bottle cap 32 is partially resting against the guide bar 14. As the bottle cap 32 moves across the guide plate 12, it encounters the dome shaped member 16 near the midpoint of the plate. If the bottle cap 32 has its flat round surface facing down, as desired, the bottle cap 32 will simply slide over the rounded edge of the housing 16 and continue along a straight path. See FIG. 5.

If, however, the bottle cap 32 slides across the surface of guide plate 12 with the open circular end of the bottle cap against the plate's surface, the bottle cap 32 will drop over the member 16. See FIG. 6. The bottle cap's open end will cover the member 16 with its outer wall and flat top surface. This exposes the bottle cap's inner wall to the air jet exiting port 18. The force of the air jet on the bottle cap's inner wall causes the cap to be shot out of the line of bottle caps being pushed across the guide plate 12. The bottle caps shot out of line, often flip, and are sent over curved edge 28 into a reject bin. Alternatively, a rotating bowl could be used to automatically direct rejected, and ideally flipped bottle caps, back to the location where the bottle cap had previously been pushed onto the guide plate 12. In this way, the mechanism of the present invention ensures only bottle caps which are orientated with the open side up will be allowed to continue through the manufacturing process, and waste from incorrect bottling will be reduced.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. Likewise, the invention can be used in connection with a variety of packaging elements and is not limited to use in conjunction with bottle caps or even sealing members.

What is claimed is:

1. An apparatus for aligning packaging elements during an automated packaging operation comprising:

a guide plate having a generally planar surface;

a dome-shaped member protruding from the surface of the guide plate;

a guide bar joined to the guide plate and located proximate the dome shaped member; and a port located within the dome shaped member through which an air stream flows capable of removing misaligned packaging elements from the guide plate.

2. The alignment apparatus as in claim 1 wherein the port directed the air stream away from the guide bar.

3. The alignment apparatus as in claim 2 wherein the guide bar is adjustably attached to the guide plate.

4. The alignment apparatus as in claim 2 wherein the guide plate is sloped.

5. The alignment apparatus as in claim 2 wherein the guide plate has at least one rounded edge.

6. The alignment apparatus of claim 5 wherein the air stream from the port is used to rotate the orientation of misaligned packaging elements.

7. The alignment apparatus of claim 1 wherein the packaging element is a bottle cap.

8. An apparatus for aligning packaging elements during an automated packaging operation comprising:

a guide plate;

a protrusion member located on the surface of the guide plate, said protrusion member coupled to an air source and having a port through which a stream of air flows, said stream of air being used to reject misoriented packaging element.

9. The alignment apparatus accessory as in claim 8 wherein an adjustable guide bar is attached to the guide plate for directing packaging elements.

10. The alignment apparatus as in claim 9 wherein the guide plate is sloped.

11. The alignment apparatus as in claim 9 wherein the air stream of air is directed away from the guide bar.

12. The alignment apparatus as in claim 9 wherein the guide plate has a rounded edge.

13. The alignment apparatus as in claim 9 wherein the stream of air generally realigns the position of the misaligned packaging elements.

14. A alignment apparatus for packaging elements for directing properly aligned packaging elements in a first direction and misaligned packaging elements in a second direction comprising:

a guide plate with a sloping planar surface;

an arced member located on the planar surface;

a port associated with said arced member, said port directing a stream of air in said second direction; and a guide bar adjustably attached to the guide plate surface wherein misaligned packaging elements are engaged by said stream of air and are moved by said stream of air in said second direction.

15. The alignment apparatus as in claim 14 further including a conveyance mechanism that transports rejected packaging elements that have been reoriented to the guide plate.

16. A method of separating packaging elements having a first alignment from packaging elements having a second alignment, said method comprising:

a. feeding said packaging elements across a generally planar surface along a first path;

b. guiding said packaging elements over a member that projects from said generally planar surface and expels a stream of air in the general direction of a second path;

c. wherein those packaging elements having said first alignment continue along said first path and those packaging elements having a second alignment are engaged by said stream of air and are diverted to said second path.

* * * * *